US012106181B2

(12) United States Patent
Vuletic et al.

(10) Patent No.: US 12,106,181 B2
(45) Date of Patent: Oct. 1, 2024

(54) ALL-TO-ALL COUPLED QUANTUM COMPUTING WITH ATOMIC ENSEMBLES IN AN OPTICAL CAVITY

(71) Applicant: Massachusetts Institute of Technology, Cambridge, MA (US)

(72) Inventors: Vladan Vuletic, Cambridge, MA (US); Joshua Ramette, Cambridge, MA (US); Zachary Vendeiro, Cambridge, MA (US); Mikhail Lukin, Cambridge, MA (US)

(73) Assignees: Massachusetts Institute of Technology, Cambridge, MA (US); President and Fellows of Harvard College, Cambridge, MA (US)

( * ) Notice: Subject to any disclaimer, the term of this patent is extended or adjusted under 35 U.S.C. 154(b) by 757 days.

(21) Appl. No.: 17/237,155

(22) Filed: Apr. 22, 2021

(65) Prior Publication Data

US 2021/0398009 A1 Dec. 23, 2021

Related U.S. Application Data

(60) Provisional application No. 62/705,322, filed on Jun. 22, 2020.

(51) Int. Cl.
*G06N 10/00* (2022.01)
*H04B 10/70* (2013.01)

(52) U.S. Cl.
CPC ............. *G06N 10/00* (2019.01); *H04B 10/70* (2013.01)

(58) Field of Classification Search
CPC ................................ G06N 10/00; H04B 10/70
See application file for complete search history.

(56) References Cited

U.S. PATENT DOCUMENTS 5,768,297 A * 6/1998 Shor ...................... G06N 10/00
714/763
10,504,033 B1 * 12/2019 King ..................... G06N 10/40
(Continued)

FOREIGN PATENT DOCUMENTS

EP          1310910 A1 *  5/2003    ............ B82Y 10/00
WO  WO-2019014589 A1 *  1/2019    ............ B82Y 40/00

OTHER PUBLICATIONS

Shahriar, M. S., G. S. Pati, and K. Salit. "Quantum communication and computing with atomic ensembles using a light-shift-imbalance-induced blockade." Physical Review A 75.2 (2007): 022323. (Year: 2007).*

(Continued)

*Primary Examiner* — David E Smith
*Assistant Examiner* — Christopher J Gassen
(74) *Attorney, Agent, or Firm* — Smith Baluch LLP

(57) ABSTRACT

A quantum computer uses interactions between atomic ensembles mediated by an optical cavity mode to perform quantum computations and simulations. Using the cavity mode as a bus enables all-to-all coupling and execution of non-local gates between any pair of qubits. Encoding logical qubits as collective excitations in ensembles of atoms enhances the coupling to the cavity mode and reduces the experimental difficulty of initial trap loading. By using dark-state transfers via the cavity mode to enact gates between pairs of qubits, the gates become insensitive to the number of atoms within each collective excitation, making it possible to prepare an array of qubits through Poissonian loading without feedback.

18 Claims, 6 Drawing Sheets

(56) References Cited

U.S. PATENT DOCUMENTS

2004/0264958 A1* 12/2004 Zoller ............... H04B 10/70
398/40
2021/0272005 A1* 9/2021 King ................ G06N 10/00

OTHER PUBLICATIONS

Wade, Andrew CJ, Marco Mattioli, and Klaus Mølmer. "Single-atom single-photon coupling facilitated by atomic-ensemble dark-state mechanisms." Physical Review A 94.5 (2016): 053830. (Year: 2016).*
Ryabtsev, Igor I., Denis B. Tretyakov, and Ilya I. Beterov. "Applicability of Rydberg atoms to quantum computers." Journal of Physics B: Atomic, Molecular and Optical Physics 38.2 (2005): S421. (Year: 2005).*
Lukin MD, Fleischhauer M, Cote R, Duan LM, Jaksch D, Cirac JI, Zoller P. Dipole blockade and quantum information processing in mesoscopic atomic ensembles. Phys Rev Lett. Jul. 16, 2001;87(3):037901. doi: 10.1103/PhysRevLett.87.037901. Epub Jun. 26, 2001. PMID: 11461592. (Year: 2001).*
Hao YM, Lin GW, Xia K, Lin XM, Niu YP, Gong SQ. Quantum controlled-phase-flip gate between a flying optical photon and a Rydberg atomic ensemble. Sci Rep. May 12, 2015;5:10005. doi: 10.1038/srep10005. PMID: 25966448; PMCID: PMC4428053. (Year: 2015).*
Beterov, I. I., et al. "Coherent control of mesoscopic atomic ensembles for quantum information." Laser Physics 24.7 (2014): 074013. (Year: 2014).*
Brion, Etienne, Klaus Mølmer, and Mark Saffman. "Quantum computing with collective ensembles of multilevel systems." Physical review letters 99.26 (2007): 260501. (Year: 2007).*
Saffman, Mark. "Quantum computing with atomic qubits and Rydberg interactions: progress and challenges." Journal of Physics B: Atomic, Molecular and Optical Physics 49.20 (2016): 202001. (Year: 2016).*
Altman et al., "Quantum Simulators: Architectures and Opportunities." arXiv preprint arXiv:1912.06938 (2019). 41 pages.
Bauer et al., Report on the NSF Workshop on Enabling Quantum Leap: Quantum algorithms for quantum chemistry and materials. Report on a National Science Foundation workshop. Nov. 12, 2019. 115 pages.
Bernien et al., "Probing many-body dynamics on a 51-atom quantum simulator." Nature 551.7682 (2017): 579-584.
Dudin et al., "Observation of coherent many-body Rabi oscillations." Nature Physics 8.11 (2012): 790-794.

Dür et al., "Three qubits can be entangled in two inequivalent ways." Physical Review A 62.6 (2000): 062314. 12 pages.
Ebert et al., "Atomic Fock state preparation using Rydberg blockade." Physical Review Letters 112.4 (2014): 043602. 5 pages.
Ebert et al., "Coherence and Rydberg blockade of atomic ensemble qubits." Physical Review Letters 115.9 (2015): 093601. 5 pages.
García-Álvarez et al., "Digital quantum simulation of minimal AdS/CFT." Physical Review Letters 119.4 (2017): 040501. 6 pages.
Levine et al., "High-fidelity control and entanglement of Rydberg-atom qubits." Physical Review Letters 121.12 (2018): 123603. 6 pages.
Pellizzari et al., "Decoherence, continuous observation, and quantum computing: A cavity QED model." Physical Review Letters 75.21 (1995): 3788. 4 pages.
Saffman et al., "Quantum information with Rydberg atoms." Reviews of Modern Physics 82.3 (2010): 2313. 51 pages.
Sárkány et al., "Long-range quantum gate via Rydberg states of atoms in a thermal microwave cavity." Physical Review A 92.3 (2015): 030303. 5 pages.
Wade et al., "Single-atom single-photon coupling facilitated by atomic-ensemble dark-state mechanisms." Physical Review A 94.5 (2016): 053830. 7 pages.
Zeiher et al., "Microscopic characterization of scalable coherent Rydberg superatoms." Physical Review X 5.3 (2015): 031015. 8 pages.
Zhang et al., "Fidelity of a Rydberg-blockade quantum gate from simulated quantum process tomography." Physical Review A 85.4 (2012): 042310. 14 pages.
Zheng et al., "Efficient scheme for two-atom entanglement and quantum information processing in cavity QED." Physical Review Letters 85.11 (2000): 2392. 4 pages.
International Search Report and Written Opinion in International Patent Application No. PCT/US2021/028569 mailed Jul. 22, 2021, 16 pages.
Saffman et al., "Quantum information with Rydberg atoms." arXiv preprint arXiv:0909.4777v3 (2010). 53 pages.
Sawant et al., "Lasing by driven atoms-cavity system in collective strong coupling regime." Scientific reports 7.1 (2017): 1-9.
Spethmann et al., "Cavity-mediated coupling of mechanical oscillators limited by quantum backaction." arXiv preprint arXiv:1505.05850 (2015). 25 pages.
Zhao et al., "Nonadiabatic holonomic quantum computation with Rydberg superatoms." arXiv preprint arXiv:1811.00840 (2018). 8 pages.
Zheng et al., "Geometric manipulation of ensembles of atoms on an atom chip for quantum computation." Physical Review A 86.3 (2012): 032323. 17 pages.

* cited by examiner

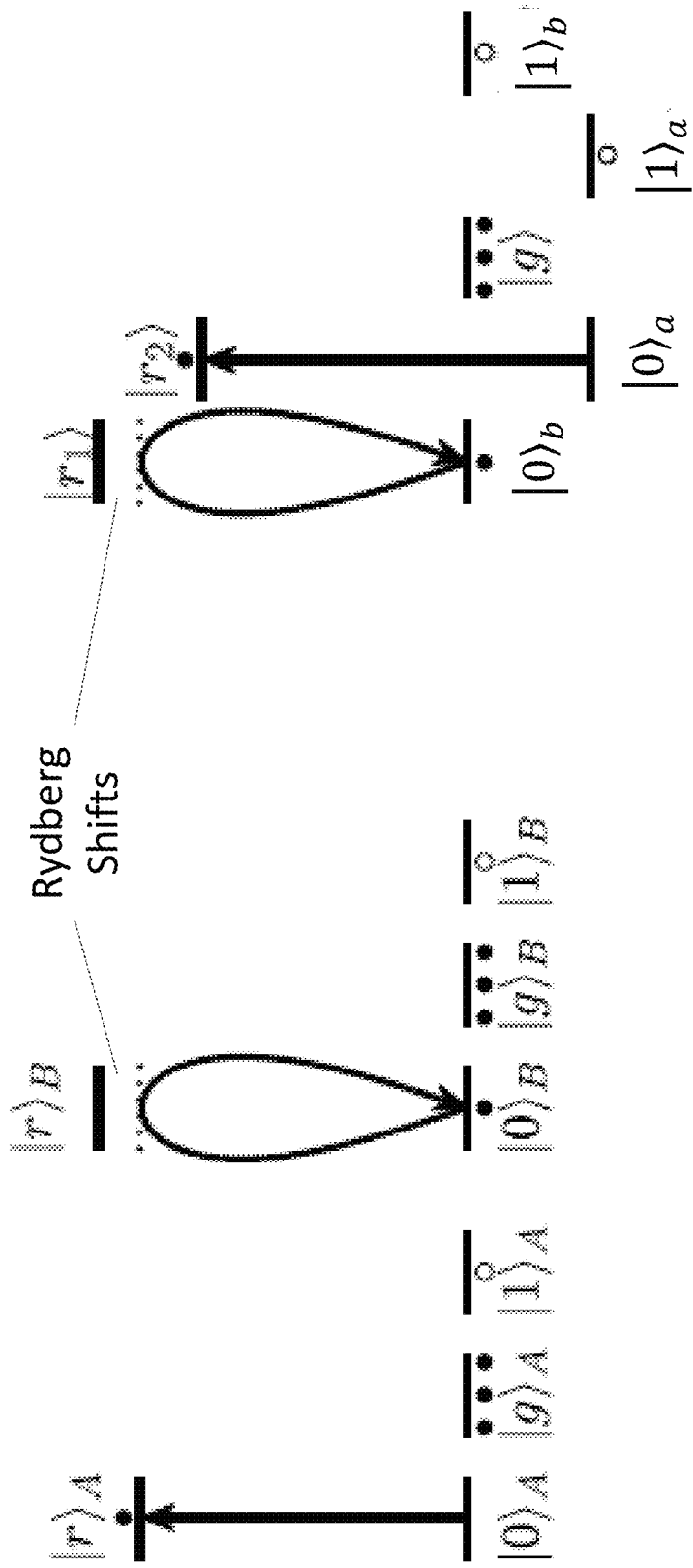

ALL-TO-ALL COUPLED QUANTUM COMPUTING WITH ATOMIC ENSEMBLES IN AN OPTICAL CAVITY

CROSS-REFERENCE TO RELATED APPLICATION(S)

This application claims the priority benefit, under 35 U.S.C. 119(e), of U.S. Application No. 62/705,322, which was filed on Jun. 22, 2020, and is incorporated herein by reference in its entirety.

BACKGROUND

The creation of a fully programmable digital quantum computer is a long-sought goal in quantum science. Such a device would be powerful for solving many mathematical problems and uniquely suited for simulating quantum many-body Hamiltonians. Previous theoretical work has looked at building a quantum computer using an array of individually addressable single atoms coupled to an optical cavity mode. By coupling one of the logical ground states of a single atom qubit to a cavity mode, it was proposed to create a cavity mode photon conditioned on the logical state of a desired control atom. An entangling gate could then be realized by further conditioning the absorption of this photon on the logical state of an arbitrary target atom.

Directly implementing this work to achieve high fidelity quantum gates would require an array of individually addressable single atoms all coupled to an optical cavity with very high single atom cooperativity to ensure that the coherent transfer of quantum information between atoms dominates over photon losses during the gate operation. While much progress has been made toward initializing arrays of single atoms for quantum simulation, its implementation involves feedback to determine single atom trap occupancy and results in the inability to use many available trapping sites due to probabilistic loading. Similarly, while cavity QED experiments have now entered the strong coupling regime ($C_0 \equiv g_0^2/\kappa\Gamma > 1$), where single atom coupling rates $g_0$ can dominate over cavity and atomic excited state decay rates, $\kappa$ and $\Gamma$, this is still far from able to realize high fidelity quantum gates.

GOVERNMENT SUPPORT

This invention was made with government support under PHY1806765 awarded by the National Science Foundation. The government has certain rights in the invention.

SUMMARY

Instead of using a single atom qubit to a cavity mode for quantum computing, our quantum computer performs quantum computing using ensembles of atoms coupled through an optical cavity. Using collectively encoded ensembles of atoms as qubits coupled through an optical cavity mode avoids the problems associated with probabilistic trap occupancy and realizing high-fidelity gates with single-atom qubits. Encoding the logical states of the qubits as excited states of the atomic ensembles enhances the coupling to the cavity and reduces two-qubit gate errors. Additionally, initializing an array of atomic ensembles involves simply Poissonian loading of a set of trapping beams from a magneto-optical trap. Quantum gates between atomic ensembles can be made robust against uncertainty in the collective coupling caused by fluctuations in the ensemble atom number N by using a dark-state transfer to move excitations from between ensembles.

In contrast to most other physical platforms for quantum computing and simulation, a platform with atom ensembles in an optical cavity allows for the direct implementation of arbitrary non-local gates. This greatly simplifies the encoding for simulating many Hamiltonians with non-local terms whose gate depth would otherwise scale with the size of the system when implemented in a physical platform limited to local interactions. Particular examples where all-to-all coupling would be beneficial include the Sachdev-Ye-Kitaev (SYK) model and the molecular Hamiltonian. The SYK model is explicitly non-local, with Gaussian distributed couplings among all subsets of four fermions drawn from a lattice of many sites. The molecular Hamiltonian, as can be seen when written in its second quantized form, also contains non-local terms when encoded in any qubit based simulator in order to maintain anti-symmetrization of the many-body electron wavefunction.

In quantum computing, there are many ways to encode the qubits as collective excitations within each ensemble and to enact gates between pairs of qubits, especially if it is possible to prepare and manipulate highly exotic states, such as GHZ states. A quantum computer with atom ensembles in an optical cavity can encode qubits using W states, where a single excitation is shared among N atoms, because they are feasible to prepare, for example, using Rydberg superatoms and because it is possible to enact single qubit gates by direct Raman coupling between two different logical W states. Additionally, the W state is relatively robust against decoherence due to atom loss from the ensemble, in the sense that the single ensemble excitation is lost at the single-atom loss rate, whereas GHZ state decoherence from atom loss is enhanced by a factor of N.

Our quantum information processing can be implemented by trapping an array of atom ensembles within a cavity, coupling the array of atom ensembles to a resonant optical mode of the cavity, and mediating, by the resonant optical mode of the cavity, an interaction between at least two atom ensembles in the array of atom ensembles. This interaction may include transferring quantum information among atom ensembles. The interaction can be mediated by Rydberg states of atoms within the atom ensembles, e.g., by performing a Rydberg gate between excitations within the atom ensembles.

At least one of the atom ensembles in the array of atom ensembles can be initialized in a Dicke state (e.g., a W state) such that a matrix element representing a photon emission by the atom ensemble into the resonant optical mode is collectively enhanced. Initializing the atom ensemble in the Dicke state may involve using a Rydberg blockade, where Rydberg interactions between many atoms in an atom ensemble result in the creation of one excitation at a time within the atom ensemble when driven by an external laser beam.

The mediated interaction may be a dark-state transfer of quantum information from a first atom ensemble in the array of atom ensembles to a second atom ensemble in the array of atom ensembles via the resonant optical mode of the cavity. Performing such a dark-state transfer may include causing the first atom ensemble to emit a photon into the resonant optical mode of the cavity and causing the second atom ensemble to absorb the photon. This photon can encode a quantum state of the first atom ensemble. The first and second atom ensembles can be separated from each other in the array of atom ensembles by at least one other atom ensemble (that is, the first and second atom ensembles may not be directly next to each other in the array of atom ensembles). In some cases, the dark-state transfer is a first dark-state transfer, and the second atom ensemble has at least two internal energy states. In these cases, there may be a second dark-state transfer of quantum information, performed (optionally) simultaneously with the first dark-state transfer, from a third atom ensemble in the array of atom ensembles to the second atom ensemble via the resonant optical mode of the cavity.

The mediated interaction may include transferring quantum information from two atom ensembles in the array of atom ensembles to a third atom ensemble in the array of atom ensembles. Once this transfer is complete, a local Rydberg gate can be performed on the quantum information transferred to the third atom ensemble. Alternatively, or in addition, the mediated interaction may involve transferring quantum information from a first pair atom ensembles in the array of atom ensembles to a second pair of atom ensembles in the array of atom ensembles. In this case, a local Rydberg gate can be performed on the quantum information transferred to the second pair of atom ensembles.

The atom ensembles can encode quantum information using a W state, which can be created using a Rydberg blockade, e.g., by transferring quantum information from two atom ensembles in the array of atom ensembles to a third atom ensemble in the array of atom ensembles.

A quantum information processor may include a cavity, a first laser, and a second laser. The first laser is optically coupled to the cavity and traps an array of atom ensembles within the cavity. For instance, the first laser can generate optical dipole traps and/or a standing-wave optical lattice to hold the atom ensembles. The second laser is in optical communication with the array of atom ensembles and mediates an interaction between first and second atom ensembles in the array of atom ensembles via a resonant optical mode of the cavity. A beam-scanning element, in optical communication with the array of atom ensembles and the second laser, can direct a laser pulse emitted by the second laser to the first atom ensemble.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

Figure 1A:
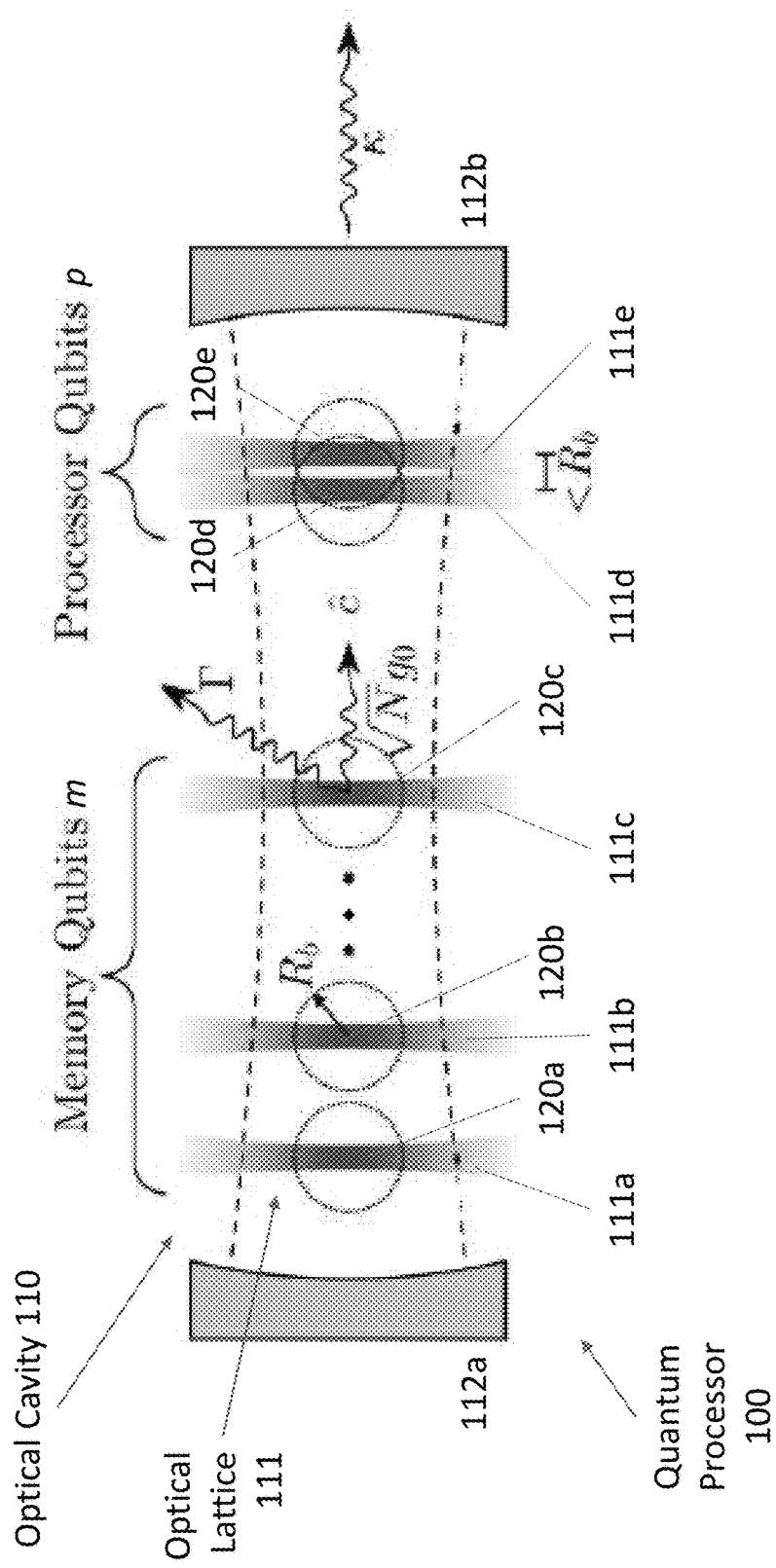
FIG. 1A shows an architecture for a quantum computer, comprising an array of individually addressed ensembles of N atoms held by dipole traps and coupled to a cavity mode $\hat{c}$ with single atom coupling rate $g_0$.
Figure 2:
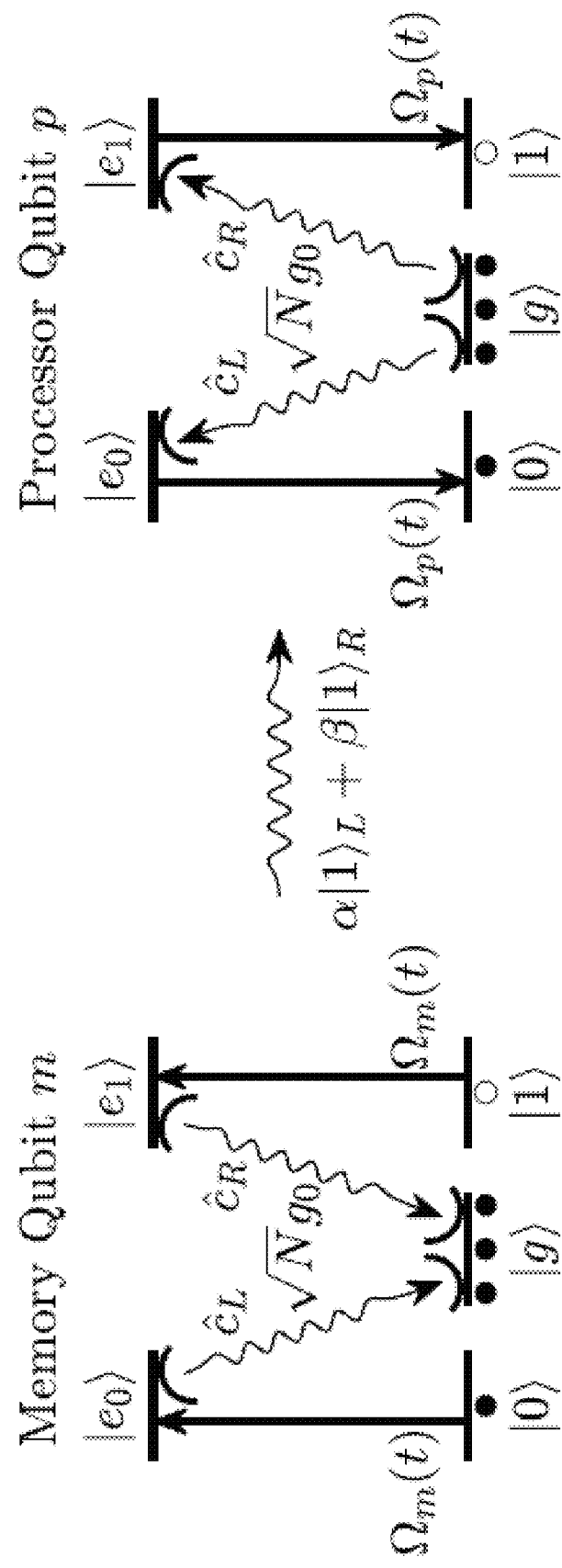

FIG. 2 shows a dark-state transfer of the quantum information from a memory qubit to a processor qubit in the quantum computer of FIG. 1A via left and right circularly polarized cavity modes $\hat{c}_L$ and $\hat{c}_R$, respectively. Initially, with laser Rabi frequencies addressing the memory and processor ensembles of strengths $\Omega_m=0$ and $\Omega_p>0$, the dark state is $(\alpha|0\rangle_m+\beta|1\rangle_m)\otimes|g\rangle_p$. Subsequently, slowly ramping up $\Omega_m$ then ramping $\Omega_p$ down to zero transfers the state from the memory qubit to the processor qubit by adiabatically changing the dark state to $|g\rangle_m\otimes(\alpha|0\rangle_p+\beta|1\rangle_p)$.

FIG. 3A illustrates a CNOT gate operation with a Rydberg processor using two separate processor ensembles close enough to be within the same blockade radius.

FIG. 3B illustrates a CNOT gate operation with a Rydberg processor employing a single ensemble and two distinct Rydberg levels.

Figure 4B:
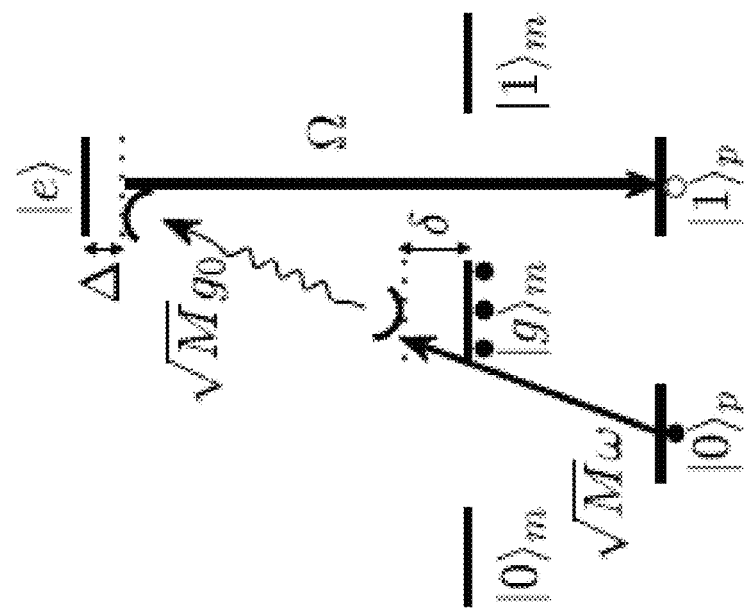
Figure 4A:
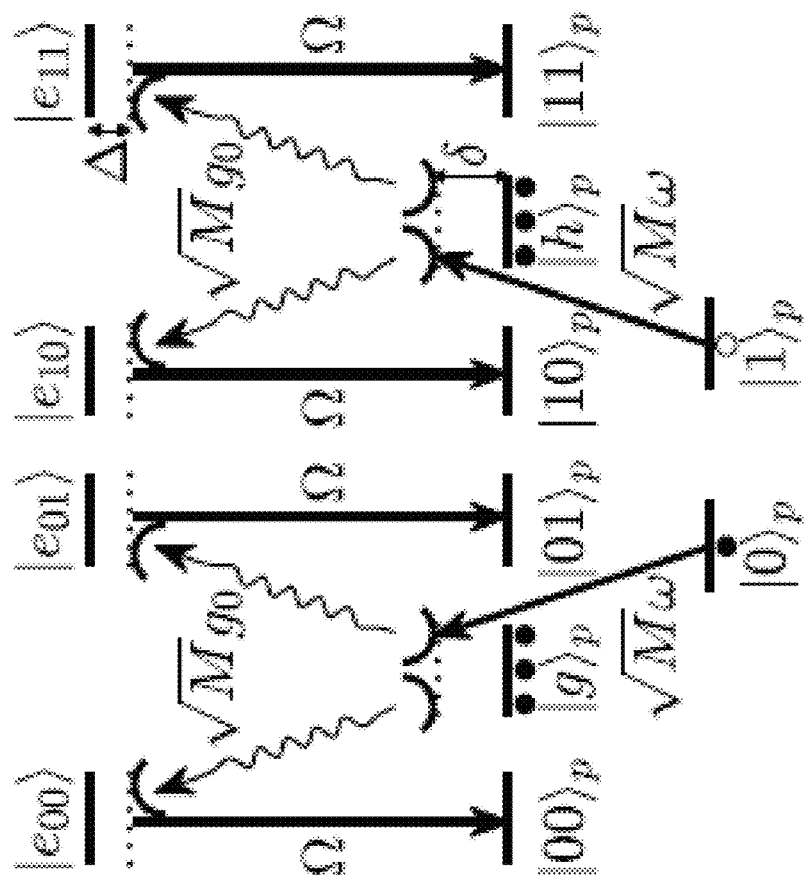

FIG. 4A shows a process to generate an entangling gate without using Rydberg levels in a single processor ensemble of M atoms. A microwave drive $\omega$ is detuned by $\delta$ from two reservoir ensembles (could be replaced by a two-photon Raman drive). $\omega$ and $g_0$ are both enhanced by a factor of $\sqrt{M}$.

FIG. 4B shows an alternative process of generating an entangling gate with fewer internal levels. In this example, the entire set of memory qubit ensembles, apart from the target and control qubits, is collectively employed as the processor ensemble to boost the participating atom number. Each memory qubit m's quantum information remains stored separately in states $|0\rangle_m$ and $|1\rangle_m$ while $|0\rangle_p$ and $|1\rangle_p$ are used for processing.

Figure 5:
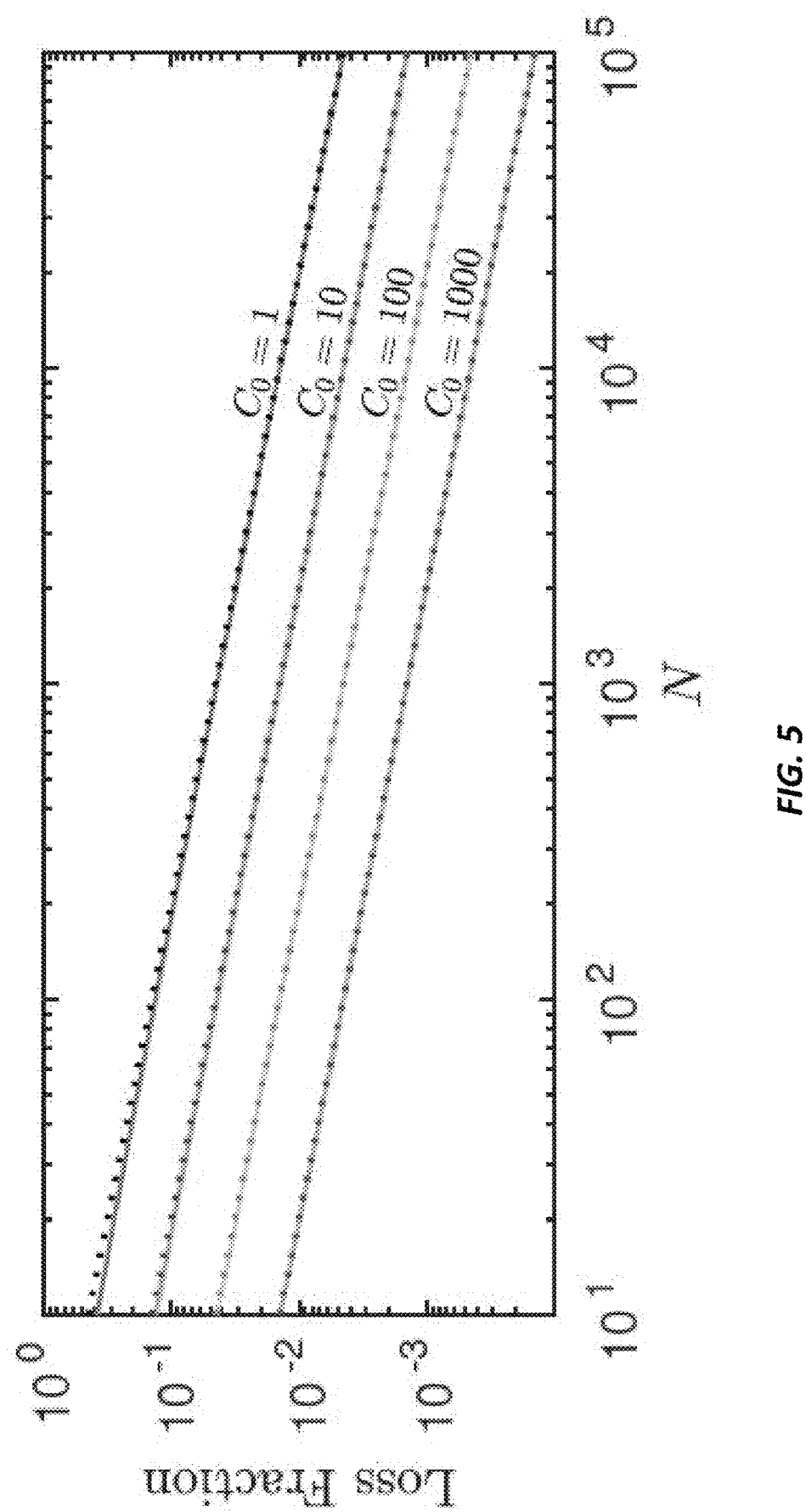

FIG. 5 illustrates a simulation of the dark-state transfer of Eq. (1) (below) with cavity and excited-state decay terms added. The final squared modulus of the amplitude successfully transferred into the processor qubit is plotted against the number of atoms per ensemble N. Solid lines are numerical results with different single atom cooperativities $(C_0=g_0^2/\kappa\Gamma)$, and the dashed lines represent a power law fit to the asymptotic behavior, which gives $P_{error}=1.4/(NC_0)^{1/2}$.

DETAILED DESCRIPTION

FIG. 1A illustrates a quantum processor or quantum computer 100 including both memory qubits m and processor qubits p, created as an array of individually addressed atom ensembles 120a-120e (collectively, atom ensembles 120), each of which includes N atoms, where N is a positive integer. The atom ensembles 120a-120e are held in respective dipole traps 111a-111e (collectively, dipole traps 111) that arranged in an array or along a lattice along the axis of an optical cavity 110. In this example, the optical cavity 110 is between a pair of curved, partially reflecting mirrors 112a and 112b. The atom ensembles 120 are coupled to a common cavity mode $\hat{c}$ of the optical cavity 110 with single atom coupling rate $g_0$ and designated as either memory or processor qubits.

The atoms making up the atom ensembles 120 may include Rydberg atoms, which are atoms with one or more electrons excited into high-energy or Rydberg states (i.e., one or more electrons with very high principal quantum numbers), in which case the quantum processor 120 is a Rydberg processor. The large distances between the high-energy electrons and atomic nuclei in Rydberg atoms lead to strong, tunable interactions among Rydberg atoms. These interactions can produce a Rydberg excitation blockade, or simply Rydberg blockade, which results from the interactions shifting the energy levels of the atoms. For example, a Rydberg blockade may result from a shift (e.g., an increase) in the energy level of an excited state. If that shift is large enough, then it may tune the energy level transition to that state out of resonance with an incident laser beam, effectively blockading excitation by the incident laser beam of electrons to that energy level and higher energy levels.

Figure 1B:
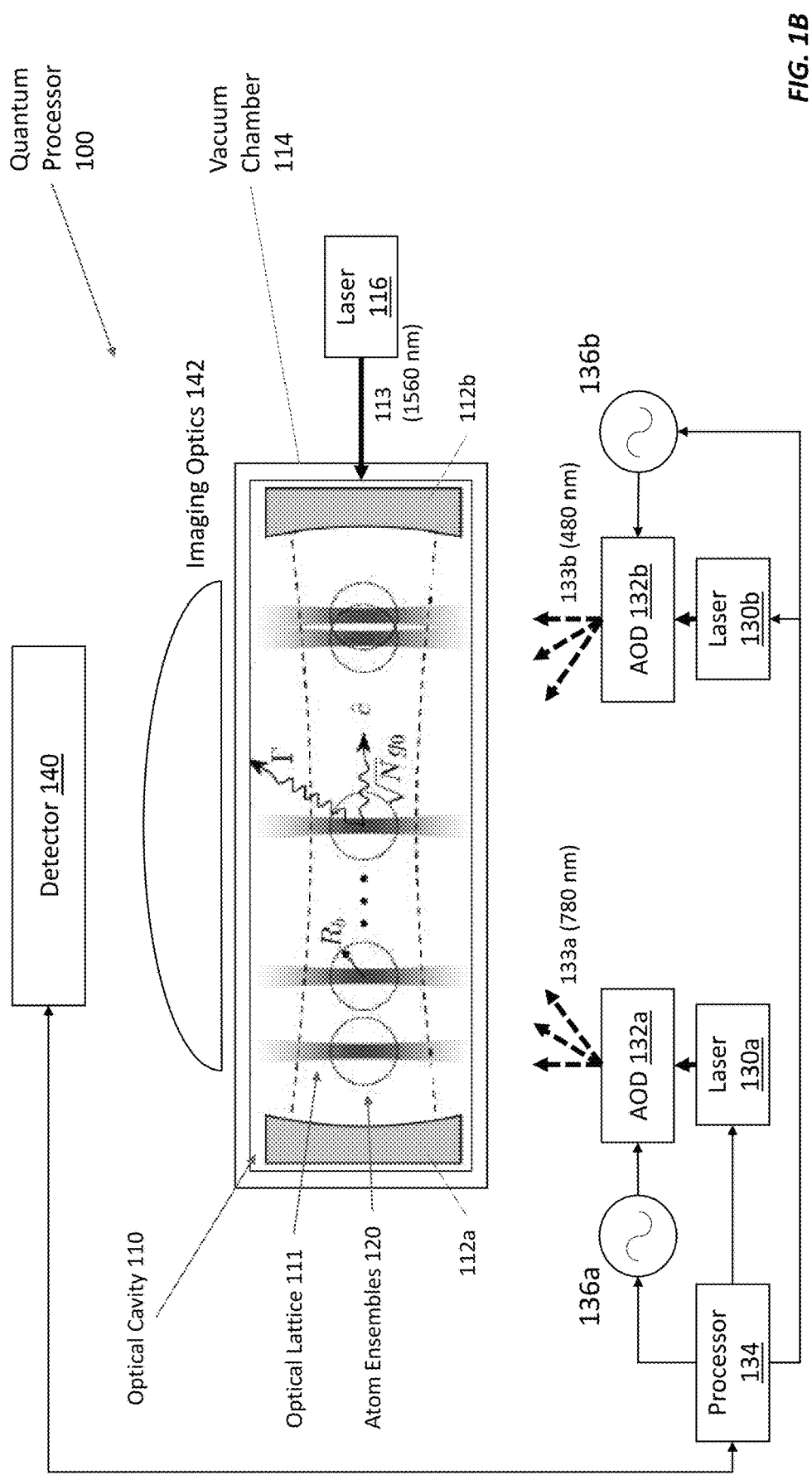
FIG. 1B shows an implementation of the quantum architecture of FIG. 1A.

The distance between Rydberg atoms at which the blockade sets in is called the blockade radius $R_b$ and can be determined by setting the interaction strength equal to the Rabi frequency of the beam used to drive the atom from the ground state to the Rydberg state. FIGS. 1A and 1B shows the blockade radii as dashed circles of radius $R_b$ surrounding each atom ensemble 120. Typically, every atom within an atom ensemble is within the Rydberg blockade radius of every other atom within the same atom ensemble. Adjacent atom ensembles may also be within each other's Rydberg blockade radius, depending on their proximity, which can be changed by moving the atom ensemble(s) (e.g., with optical dipole traps or by tuning the lattice period).

The atom ensembles 120 can be excited or manipulated into a variety of states, including first and second excited Dicke states. A Dicke state is an equal-weight superposition of all n-qubit states with Hamming Weight k (i.e., all strings of length n with exactly k ones over a binary alphabet). The W state is one type of Dicke state. In a W state, the entangled quantum state of three qubits has the following shape:

$$|W\rangle = \frac{1}{\sqrt{3}}(|001\rangle + |010\rangle + |100\rangle).$$

Using W states (possibly prepared by driving each ensemble into a Rydberg state with blockade radius $R_b$, where within each ensemble's blockade radius only one excitation can be promoted to the Rydberg state before the rest of the atoms are blockaded and cannot subsequently also be excited to the Rydberg state) as the logical basis increases the coupling to the cavity by a factor of $\sqrt{N}$. The quantum processor's decoherence mechanisms include the loss of a cavity photon ($\kappa$) and atomic excited state decay ($\Gamma$) as shown in FIG. 1A.

This quantum processor 100 uses the cavity mode ĉ to transfer the states of any desired target and control qubits for enacting one- and two-qubit gates. Two-qubit gates are realized by copying that information into one or two ensembles 120d, 120e designated as processor qubits p, where the cavity dynamics or the Rydberg blockade effect (shown in FIG. 1A) generate a nontrivial interaction. (The other ensembles 120a-120c may be designated as memory qubits m.) Typical cavity QED experiments employ modes with characteristic widths of 10-100 µm and Rayleigh ranges of a few millimeters. Memory qubits m store quantum information and can be spaced as closely as a few optical wavelengths, admitting for a quantum processor 100 with a few thousand qubits in 1D along the cavity 110, or several tens of thousands of qubits in a 2D array.

FIG. 1B shows a possible physical implementation of the quantum processor 100 shown in FIG. 1A. This implementation includes a 1D array of atom ensembles 120 trapped in the Fabry-Perot cavity 110 formed by a pair of curved mirrors 112 and enclosed in a vacuum chamber 114. The atom ensembles 120 fill at least some lattice sites in a standing-wave optical lattice 111, which is generated by a laser beam 113 from a first laser 116 coupled into the Fabry-Perot cavity 110 through one of the partially transmitting, curved mirrors 112b and a window (not shown) in the vacuum chamber 114. This laser beam 113 is at a wavelength resonant with a mode of the optical cavity 110 that is different than the common cavity mode ĉ used for mediating the interactions among the atom ensembles 120. The standing-wave optical lattice 111 generated by this laser beam 113 defines a one-dimensional array of lattice sites, each of which may hold a corresponding atom ensemble 120. Alternatively, the laser beam 113 may traps the atom ensembles 120 in respective optical dipole traps instead being a standing wave laser along the cavity 110. Depending on the quantum processing operations and the lattice period, only some of the lattice sites may be occupied (e.g., every other lattice site) or all of the lattice sites may be occupied. In other systems, several laser beams (not shown) may interfere to create a standing wave that defines a two-dimensional lattice, with atom ensembles in some or all of the lattice sites.

This implementation also includes two pulsed lasers 130a and 130b (collectively, pulsed lasers 130), each of which emits a corresponding pulsed laser beam 133a, 133b that is deflected or steered by a corresponding acousto-optic deflector (AOD) 132a, 132b (collectively, AODs 132). The AODs 132a and 132b are driven by respective radio-frequency (RF) or microwave waveform generators 136a and 136b, which are both controlled by a processor 134 that is also coupled to and controls the pulsed lasers 130. The pulsed lasers 130 and AODs 132 may address the same group of atom ensembles 120 (e.g., the entire array) with light at different wavelengths (e.g., 480 nm and 780 nm) for two-photon and other nonlinear interactions. The pulsed lasers 130 and AODs 132 can also be used to address different groups of atom ensembles 120 or sections of the cavity 110, for example, if the cavity 110 is large and/or contains many atom ensembles 120. The pulsed lasers 130 and AODs 132 can also be used for different purposes; for example, addressing the atom ensembles 120 or trapping the atom ensembles 120.

Other implementations of a quantum information processor with cavity-coupled atom ensembles may include more or few pulsed lasers and AODs. For instance, the AODs can be replaced by galvo-scanning mirrors, piezo-actuated mirrors, microelectromechanical systems (MEMS) mirror arrays, or spatial light modulators (SLMs). A single appropriately designed AOD can steer light from two lasers at different wavelengths. Two AODs in series can be used to steer light from one or more lasers in two dimensions, e.g., for addressing atom ensembles trapped at different sites in a two-dimensional lattice. Alternatively, the system may not include any AODs or other beam-steering elements and may instead include an array of lasers to illuminate the trapped atom ensembles, with at least one laser per atom ensemble.

The pulses 133 from the pulsed lasers 130 and AODs 132 enter the cavity 110 from a direction (at least roughly) orthogonal to the lattice vector of the optical lattice 111 so that each pulse 133 can address a single atom ensemble 120. This allows random or direct access of each atom ensemble 120 trapped in the cavity 110. As described in greater detail below, the pulses 133 are at a wavelength resonant with the electronic transitions of the atom ensembles 120 and can be tuned to address different electronic transitions. This wavelength is different than the wavelength of the cavity modes used for trapping the atom ensembles 120 (e.g., 780 nm for addressing atoms versus 1560 nm for optical trapping). The wavelength of either or both pulsed lasers 130 can be tuned far from the resonance wavelength(s) (e.g., to 850 nm or 1064 nm) for forming optical dipole traps used for (at least initially) trapping the atom ensembles 120 within the cavity 110.

The pulse parameters, including widths, timing, peak power, and repetition rate, of the pulsed laser beams 133 can be set using the processor 134 to perform different quantum information processing operations. For instance, the processor 134 can change the pulse widths, timings, and shapes by changing the RF waveforms from the waveform generators 136 used to drive the AODs 132. More specifically, the laser pulses 133 have wavelengths, peak powers, durations, deflection angles, and timings chosen to manipulate the states of different atom ensembles 120, e.g., to produce π-pulses or π/2 pulses. For instance, these pulses can have durations of around 0.1-10 μs and beam powers corresponding to Rabi frequencies of 0.1-100 MHz. A far-detuned optical dipole trap produced by an AOD might be on at constant power for the entire experiment, perhaps many milliseconds, to trap the atoms for the duration of the gates and manipulations. These manipulations may cause an atom ensemble 120 to emit a photon into a common cavity mode, absorb a photon from the common cavity mode, rotate between different internal states, become excited to a Rydberg state, or rotate between different Rydberg states.

The AODs 132 can also be used trap the atom ensembles 120 in optical dipole traps, at least initially, in or near the different lattice sites in the cavity 110. For example, the beam-steering element 130 can be used to move and hold atom ensembles 120 to particular locations within the cavity 110 before the laser beam 113 from the laser 116 is on or at a power level high enough to generate the standing-wave optical lattice 111. Once the atom ensembles 120 are at or near the desired locations, the laser beam 113 can be turned on and/or increased in power to generate the standing-wave optical lattice 111, trapping the atom ensembles 120 at the desired locations within the cavity 110. The atom ensembles 120 can be released by turning off or attenuating the laser beam 113. The AODs 132 can also be used instead of the laser 116 to trap the atom ensembles 120.

For optical trapping, the laser pulses coming out of the AOD 132 could be "far red detuned" from the main 780 nm resonance in $^{87}$Rb to form optical dipole traps. Optical dipole traps at to 850 nm or 1064 nm trap $^{87}$Rb atoms well and can be positioned with arbitrary placement by the AOD, such that atom ensembles can be positioned within or outside mutual Rydberg blockade radii. The standing-wave optical lattice 111 (e.g., at 1560 nm) is optional and is convenient for holding the atom ensembles in place after the atom ensembles have been positioned with the optical dipole traps.

A lens system 142 and detector array 140, such as a CCD coupled to the processor 134, outside the vacuum chamber 114 read out the states of the atom ensembles 120. The atom ensembles 120 fluoresce and/or absorb incident light, depending on their states. The lens system 142 images the atom ensembles 120 onto the detector array 140. The detector array 140 acquires images of the atom ensembles 120, with bright spots indicating fluorescence and dark spots indicating absorption. It transmits them to the processor 134 for processing. For example, each atom ensemble 120 may be illuminated with resonant light, which is either scattered or not scattered at all depending on which internal ground state the atom is in. The optics 142 collect the scattered light and focus it onto a detector 140, which detects the scattered photons to determine the internal state of the atoms in the atom ensembles.

The atom ensembles 120 may be ensembles of around 10 to $10^5$ Rubidium-87 atoms each. The $^{87}$Rb atoms have a transition from a ground state to an excited state at 780 nm, in the near-infrared region of the electromagnetic spectrum. This transition could be used as depicted in FIG. 2 for cavity transfers. Furthermore, the $^{87}$Rb ground state is split into eight sublevels due to the hyperfine interaction between the electron and atomic nucleus magnetic moments. These different hyperfine sublevels within the ground state can be selected to function as the logical states $|0\rangle$ and $|1\rangle$ and the state $|g\rangle$ by addressing with the appropriate frequencies or polarizations of the 780 nm light. For instance, the frequencies of the laser pulses can be tuned finely using external devices, such as electro-optic modulators. And the polarization can be set to match the cavity-mode polarization state with polarizers, wave plates, and/or other polarizing components.

Inside the vacuum chamber 114, the optical cavity 110 may have a Gaussian waist of 10-100 μm and a Rayleigh range along the axis of the cavity 110 of a few millimeters. Piezoelectric actuators (not shown) can be used to move the mirrors 112 closer to each other or farther apart, adjusting the length of the cavity 110 to tune the cavity mode into resonance with an electronic transition of the atom ensembles (e.g., the 780 nm transition of $^{87}$Rb). With a length of a few centimeters and super-polished mirrors 112, the cavity 110 could have a decay rate in the range of 1 kHz to 100 kHz.

The atom ensembles 120 could be trapped around 3 μm to 30 μm apart inside the cavity 110, either using far off resonant trapping light from a beam-steering element 130 or the standing-wave optical lattice 111 along the cavity 110 itself, for example, at 1560 nm, which would also be resonant with the cavity when its length is tuned to be resonant at 780 nm.

To enact a dark-state transfer such as in FIG. 2 (described below), another beam-steering element 130b illuminates each atom ensemble with a specific beam of 780 nm light. The AOD(s) can vary the intensity of this light independently for each atom ensemble (these intensities are represented by the quantities $\Omega_m$ and $\Omega_p$). Ramping the intensities of these beams as described in FIG. 2 accomplishes the transfer.

To process with the Rydberg states using $^{87}$Rb as shown in FIGS. 3A and 3B (described below), the second pulsed laser 130b may emit light at 480 nm as either a global addressing beam that simultaneously illuminates all of the atom ensembles 120 or illuminates specific atom ensembles 120 using the corresponding AOD 132b. By hitting an atom ensemble 120 with both 780 nm and 480 nm light, an $^{87}$Rb atom in the atom ensemble 120 undergoes a two-photon transition to a highly excited Rydberg state. Since both 780 nm and 480 nm light cause the Rydberg transition via the two-photon transition, addressing the ensembles individually with the 780 nm light controls whether individual ensembles are excited to Rydberg states. By controlling either the frequency or the polarization of the 780 nm or 480 nm light, it is possible to selectively excite desired ensembles 120 to specific Rydberg states.

The state of each ensemble can be read out using fluorescence imaging, where an ensemble is illuminated by 780 nm light on resonance with the ground-to-excited state transition with the correct frequency or polarization such that the atom ensemble can scatter the 780 nm light only if it is in either the logical $|0\rangle$ state or the logical $|1\rangle$ state. Whether or not scattered light is observed is therefore a measurement of which state the atom occupies. The lens 142 collects the scattered 780 nm light and focuses it onto the CCD camera 140 for fluorescence imaging.

Single-Qubit Gates and Cavity Transfers

The quantum processor in FIGS. 1A and 1B can be configured in a variety of different ways to perform different quantum operations on states stored in the memory qubits. The operations include dark-state transfers from memory to processor qubits, shown in FIG. 2; controlled phase (C-phase) gates, shown in FIGS. 3A and 3B; and entangling gates, shown in FIGS. 4A and 4B. These processes can be used together or separately. The different processor configuration errors scale in different ways with ensemble atom number and have specific technical advantages or disadvantages. Using a typical ultracold atom trapping setup, it is possible to switch between the different processor configurations.

To understand operation of the quantum computer 100 in FIGS. 1A and 1B, consider an atom ensemble of N atoms (a single qubit), where the ith atom from the ensemble has three ground state levels, $|g_i\rangle$, $|0_i\rangle$, $|1_i\rangle$, and an excited state $|e_i\rangle$, with the $|g_i\rangle$ to $|e_i\rangle$ transition coupled to a cavity mode $\hat{c}$. Define the logical qubit states $|0\rangle$ and $|1\rangle$ as follows, where the remaining N−1 atoms in both cases remain in states $|g_i\rangle$:

$$|0\rangle = \frac{1}{\sqrt{N}} \sum_{i=1}^{N} |0_i\rangle \otimes |g\rangle^{N-1}$$

$$|1\rangle = \frac{1}{\sqrt{N}} \sum_{i=1}^{N} |1_i\rangle \otimes |g\rangle^{N-1}$$

The quantum processor can then execute arbitrary single-qubit gates that rotate between $|0\rangle$ and $|1\rangle$ through a two-photon Raman transition, which introduces the following Hamiltonian in the rotating frame as a sum of terms for each atom, with a two-photon coupling with strength $\Omega_R$ and phase offset $\phi$:

$$H_{1qubit} = \sum_{i=1}^{N} \left(\Omega_R e^{-i\phi} |0_i\rangle\langle 1_i| + h.c.\right)$$

Calculating matrix elements gives $\langle 0|H_{1qubit}|1\rangle = \langle 1|H_{1qubit}|0\rangle^* = \Omega_R e^{-i\phi}$, which enables the quantum processor to enact arbitrary single-qubit gates with this Raman coupling, which in turn occurs at the single-atom coupling rate $\Omega_R$, independent of N. While this works for the W states (first excited Dicke states), this does not hold in general for more exotic logical states. For example, if GHZ states or the second excited Dicke states were used as the logical states, while it would be possible to execute a bit flip with a π-pulse, attempting to enact a Hadamard gate with a π/2 pulse would take the state out of the code space.

Using the cavity mode $\hat{c}$, the quantum processor can transfer excitations from memory qubits to the processor qubits (initialized into state $|g\rangle^N$). Consider transferring the state $|0\rangle$. This can be achieved by using an off-resonant beam coupling $|0\rangle$ to $|e\rangle$ and applying direct π-pulses at rate $\sqrt{N}g_0$, first on the memory qubit to emit a photon into $\hat{c}$, then on the processor qubit to absorb that photon. In other words, the memory qubit is illuminated with an off-resonant π-pulse, which causes the memory qubit to emit a photon into the cavity mode, then the processor qubit is illuminated with another off-resonant π-pulse, which causes the processor qubit to absorb the photon from the cavity mode. This transfer is ensemble-enhanced by a factor of $\sqrt{N}$ for error reduction and is an alternative to a dark-state transfer. Unlike in the case of the dark-state transfer, selecting the correct duration of the π-pulse involves knowing the atom number in each ensemble precisely, which may be impractical. The duration of these direct π-pulses varies depending on N, so to make the transfer robust against uncertainty in N, the quantum processor may use an on-resonance dark-state transfer instead.

The Hamiltonian for the on-resonance dark-state transfer include terms coupling each of the atoms in the memory qubit (m) and processor qubit (p) to the cavity mode:

$$H_{trans} = \sum_{i=1}^{N} \left(\Omega_m |0_i\rangle_{mm}\langle e_i| + g_0 \hat{c}|e_i\rangle_{mm}\langle g_i| + h.c.\right) + \sum_{j=1}^{N} \left(\Omega_p |0_j\rangle_{pp}\langle e_j| + g_0 \hat{c}|e_j\rangle_{pp}\langle g_j| + h.c.\right)$$

We can simplify this Hamiltonian by constraining its expression to the symmetric states accessible within the energy manifold of a single excitation, where the many-atom matrix elements result in an enhancing factor of $\sqrt{N}$ for the coupling to the cavity mode:

$$H_{trans} = \left(\Omega_m |0\rangle_{mm}\langle e| + \sqrt{N} g_0 \hat{c}|e\rangle_{mm}\langle g| + h.c.\right) + \left(\Omega_p |0\rangle_{pp}\langle e| + \sqrt{N} g_0 \hat{c}|e\rangle_{pp}\langle g| + h.c.\right) \quad (1)$$

which has the following dark state amenable to use for a cavity transfer:

$$|D\rangle \propto \Omega_m \sqrt{N} g_0 |g\rangle_m |0\rangle_p |0\rangle_c + \Omega_p \sqrt{N} g_0 |\\
\quad 0\rangle_m |g\rangle_p |0\rangle_c - \Omega_m \Omega_p |g\rangle_m |g\rangle_p |1\rangle_c$$

where the key with the subscript c indicates the photon number occupation of the mode $\hat{c}$. We can begin the transfer with the dark state $|0\rangle_m |g\rangle_p |0\rangle_c$ by initially setting $\Omega_m = 0$ and $\Omega_p$ large compared to $\sqrt{N}g_0$. Adiabatically ramping up $\Omega_m$ and subsequently ramping $\Omega_p$ off leaves the final state as $|g\rangle_m |0\rangle_p |0\rangle_c$. The ramping durations depend on the system; for the $^{87}$Rb system described above, they may be about 10 microseconds each, with no delay between ramps.

FIG. 2 illustrates independent, simultaneous dark-state transfer of the states $|0\rangle$ and $|1\rangle$ from a memory qubit m (left) to a processor qubit p (right). Each qubit is implemented as an atom ensemble of N atoms trapped inside an optical cavity and coupled to a cavity mode. The atoms in each ensemble have states $|g\rangle$, $|0\rangle$, $|1\rangle$, $|e_0\rangle$, and $|e_1\rangle$. The empty and filled circles above or below each state indicate that state's population. Straight arrows represent external drives (e.g., laser or microwave pulses) and squiggly arrows represent emitted photons.

Before the dark-state transfer begins, the memory qubit m is prepared as follows, starting with all of the atoms in the memory-qubit atom ensemble in the ground state $|g\rangle$. One atom in the memory-qubit atom ensemble is excited into a Rydberg state (not shown) with a two-photon interaction (e.g., absorption of 480 nm and 780 nm photons). (More precisely, the memory-qubit atom ensemble is in a collective superposition of which atom is excited.) If the atoms within the memory-qubit atom ensemble are within the Rydberg blockade radius, Rydberg interactions shift the excited-state energy levels of the other atoms in the memory-qubit atom ensemble, precluding excitation of the other atoms to the same state. After preparing one excitation in the Rydberg state $|r\rangle$, that excitation is moved to a ground state $|0\rangle$ using another two-photon process. The ensemble is now initialized in the state $|0\rangle$ and can be rotate between the $|0\rangle$ and $|1\rangle$ state. At this point, the memory qubit m is ready to transfer quantum information to the processor qubit p, e.g., for two-qubit processing.

The dark-state memory transfer is initiated by illuminating the memory qubit m with a laser pulse of Rabi frequency $\Omega_M$. This can be accomplished by adiabatically increasing the laser pulse intensity from $\Omega_M=0$ to $\Omega_M\gg\sqrt{N}g_0$. The memory qubit m responds to this laser pulse by emitting a photon into the cavity mode $\hat{c}$. If the photon is emitted by from the excited state $|0\rangle$ to the ground state $|g\rangle$ via state $|e_0\rangle$, the photon is emitted into the left-hand circularly polarized cavity mode $\hat{c}_L$; if the photon is emitted by from the excited state $|1\rangle$ to the ground state $|g\rangle$ via state $|e_1\rangle$, the photon is emitted into the left-hand circularly polarized cavity mode $\hat{c}_R$. Because the memory qubit m is in a superposition of the states $|0\rangle$ and $|1\rangle$, the emitted photon is in a weighted superposition of the left- and right-hand circular polarization states. This superposition is shown in FIG. 2 as $\alpha|1\rangle_L+\beta|1\rangle_R$, where $\alpha$ and $\beta$ are the weights and $|1\rangle_{L,R}$ represent single-photon occupations of the left- and right-hand circular polarization states. At the same time, the processor qubit p is illuminated at a laser Rabi frequency $\Omega_p$. The intensity of this laser pulse decreases from $\Omega_p\gg\sqrt{N}g_0$ to $\Omega_p=0$. An atom in the processor-qubit atom ensemble absorbs the photon emitted by the memory qubit m, leaving the final state as $|g\rangle_m(\alpha|0\rangle_p+\beta|1\rangle_p)|0\rangle_c$.

The single-qubit gate dark-state transfer process shown in FIG. 2 allows the quantum processor to move quantum information stored in a memory qubit to a processor qubit for processing or from a processor qubit to a memory qubit for storage. This dark-state transfer cannot be realized infinitely slowly with good fidelity, given that the intermediate dark state contains a component with a photon occupying the cavity mode, which is subject to decay. The error of this dark-state transfer process scales as $(NC_0)^{-1/2}$.

Two-Qubit Gates Via Rydberg Interactions

FIG. 3A illustrates implementation of a controlled phase (C-phase) gate as a local Rydberg gate between a pair of processor-qubit atom ensembles A and B held within a Rydberg blockade radius of each other (e.g., in adjacent sites in the standing-wave optical lattice). The processor-qubit atom ensembles A and B are prepared separately using the dark-state transfer process shown in FIG. 2 to move two arbitrary memory qubit states to the two processor-qubit atom ensembles A and B. In this example, both processor-qubit atom ensembles are in the $|0\rangle$ ground state. To perform the C-phase gate, processor-qubit atom ensemble A is excited from the $|0\rangle$ ground state to a Rydberg state $|r_A\rangle$ as shown in FIG. 3A by a $\pi$-pulse from a laser (e.g., laser 130a in FIG. 1B). Because the processor-qubit atom ensembles A and B are within a Rydberg blockade radius of each other, this excitation shifts the energy of the corresponding Rydberg state $|r_B\rangle$ of processor-qubit atom ensemble B from the nominal value indicated by the dotted line to a new value indicated by the solid line in FIG. 3A. In other words, the processor-qubit atom ensemble B experiences a Rydberg blockade conditioned on an atom in the processor-qubit atom ensemble A being excited to the Rydberg state $|r_A\rangle$. Illuminating the processor-qubit atom ensemble B with a subsequent $2\pi$ laser pulse connecting $|0\rangle_B$ to $|r\rangle_B$ acquires an additional phase of $(-1)$ only if the processor-qubit atom ensemble B is in state $|0\rangle_B$ and $|r\rangle_B$ is unshifted.

FIG. 3B illustrates a process for performing a C-phase gate as a local Rydberg gate with a single processor-qubit atom ensemble. This processor qubit is implemented in an atom ensemble with enough resolvable internal atomic states (here, at least five states—two states for each qubit, plus a fifth ground state) to store information from two memory qubits. In this process, the quantum information from each of two memory qubits is transferred into two different atomic states of the processor-qubit atom ensemble. The copying in FIG. 3B could also be accomplished by executing the process shown in FIG. 2 twice, copying the first memory qubit state into processor states $|0\rangle_A$ and $|1\rangle_A$, then the second memory qubit into processor states $|0\rangle_B$ and $|1\rangle_B$, using two symmetric excitations drawn from the processor ground state reservoir $|g\rangle$.

Like the two-qubit C-phase gate in FIG. 3A, the single-qubit C-phase gate in FIG. 3B uses a Rydberg blockade to control whether or not the phase of an incident pulse is shifted. Most applications of the Rydberg blockade use the dipole-dipole induced shift caused by multiple atoms attempting to populate the same excited atomic state. Large blockades, however, also exist for many pairs of distinct Rydberg states separated by many gigahertz in energy, which can be used for entangling multiple collectively encoded excitations within the same Rydberg ensemble— here, the processor-qubit atom ensemble storing the two states from the memory qubits. Using two distinct Rydberg states $|r_1\rangle$ and $|r_2\rangle$ of the processor-qubit atom ensemble with a dipole-dipole induced Rydberg shift (indicating by the distance between dotted and solid lines for $|r_1\rangle$), it is possible to execute a C-phase gate by $\pi$-pulsing $|0\rangle_a$ to $|r_2\rangle$ then connecting $|0\rangle_b$ to $|r_1\rangle$ with a $2\pi$ pulse that acquires a $(-1)$ phase, conditional upon an atom existing in state $|0\rangle_b$ and the state $|r_1\rangle$ not being shifted out of resonance. After the Rydberg processing, the two qubits of quantum information can be transferred from the processor qubit to the memory qubits to clear the processor qubit to process information from other memory qubits.

Executing the C-phase gate with Rydberg atoms as in FIGS. 3A and 3B results in a contribution from the Rydberg interaction to the overall gate error. While an error contribution of $2\times10^{-3}$ is theoretically achievable, current experiments have errors of a few percent. Although an error of a few percent may be acceptable for implementing certain quantum codes (e.g., surface or toric codes) or doing near-term short gate depth algorithms that don't require too many gates in succession. Other quantum codes could require a lower error, e.g., a $10^{-4}$ error.

Two-Qubit Gates Via Conditional Photon Absorption

One method for implementing two-qubit gates without using Rydberg states involves setting up a state in a target qubit whose evolution can be made to depend on the presence or absence of a photon in the cavity. By detuning the cavity from the processor state $|g\rangle$, it is possible to bring a third-order process into resonance such that the movement of an excitation between internal states of the processor depends on whether there is a photon to absorb from the cavity. (Here, a third-order process is a process with three legs to the multiphoton transfer, as shown in FIG. 4A or 4B, each of which involves a microwave drive ω (e.g., from a separate microwave source coupled to the cavity), cavity mode ĉ, and external laser Ω, for a total of three engaged photons (including one microwave photon). The third-order process is brought into resonance in the sense that when all three paths are present, the transfer of excitation from its initial state (e.g., 0 or 1) to some other state, is an energy-conserving process and thus allowed to happen.)

FIG. 4A illustrates one implementation of a two-qubit entanglement gate using a single processor-qubit atom ensemble p and two memory-qubit atom ensembles A and B (not shown). The processor-qubit atom ensemble has M atoms in a first reservoir $|g\rangle_p$ and M atoms in a second reservoir $|h\rangle_p$. The processor-qubit atom ensemble can be prepared in this state by optically pumping all the atoms in the first reservoir $|g\rangle_p$, then illuminating the processor-qubit atom ensemble with a π/2 pulse to move about half of the atoms to the second reservoir $|h\rangle_p$. The excited-state energy levels $|e_{ij}\rangle$ and reservoir energy levels $|g, h\rangle_p$ may be shifted by Δ and δ, respectively. These shifts are chosen based on the cavity resonance (round-trip optical path length) and the frequencies of the laser and microwave drives. The excited-state detuning may be set to Δ=0.

A microwave drive ω connects states $|0\rangle$ and $|1\rangle_p$ off-resonantly to these reservoirs $|g\rangle_p$ and $|h\rangle_p$ (this microwave drive could be replaced by a two-photon Raman drive instead), so that the legs ω and $g_0$ are enhanced by $\sqrt{M}$ but the atoms within the reservoirs themselves are not resonantly coupled to any other states. This setup is particularly clean for demonstrating the working principle of the gate but uses many atomic internal levels. There are also simpler variants of this gate that can realize a nontrivial two-qubit interaction, one of which is shown in FIG. 4B and discussed below.

First, a basic transfer (e.g., as in FIG. 2) moves the full state of the first memory qubit (not shown) into the two levels labelled $|0\rangle_p$ and $|1\rangle_p$ at the bottom of FIG. 4A. This leaves memory qubit A in state $|g\rangle$ regardless of its initial internal state. Next, the microwave drive ω and optical drive $\Omega_p$ are turned on. This does not alter the state of the processor-qubit atom ensemble since there is no photon in the cavity. Then, the quantum processor performs a dark-state transfer by ramping the classical optical drive $\Omega_B$ (not shown) controlling memory qubit B's coupling to the cavity and subsequently ramping off $\Omega_p$, which leaves memory qubit B in the state $|g\rangle$ regardless of its initial internal state.

During this transfer sequence, if the processor-qubit atom ensemble was initially in state $|0\rangle_p$, then it absorbs either a σ⁻ or σ⁺ photon (i.e., a left- or right-hand circularly polarized, cavity-mode photon) to end up in either state $|00\rangle_p$ or $|01\rangle_p$. If the processor was initially in state $|1\rangle_p$, then it absorbs either a σ⁻ or σ⁺ photon to end up in state $|10\rangle_p$ or $|11\rangle_p$. Consequently, this process executes the following mapping, sending arbitrary initially factorizable states of the memory ensembles into the four logical states of the processor-qubit atom ensemble:

$(\alpha_A|0\rangle_A+\beta_A|1\rangle_A)\otimes(\alpha_B|0\rangle_B+\beta_B|1\rangle_B)\otimes|g\rangle_p \Rightarrow |g\rangle_A$
$\otimes|g\rangle_B \otimes (\alpha_A\alpha_B|00\rangle_p+\alpha_A\beta_B|01\rangle_p+$
$\beta_A\alpha_B|10\rangle_p+\beta_A\beta_B|11\rangle_p)$ At this point, the quantum processor can apply rotations with optical Raman beams Ω to these four levels in the processor-qubit atom ensemble to generate nontrivial two-qubit interactions. For example, adding a (−1) phase to the $|11\rangle_p$ state realizes a CZ gate, or interchanging the amplitudes on $|10\rangle_p$ and $|11\rangle_p$ realizes a CNOT gate, in a similar manner as for single-atom two-qubit gates. Single-qubit gates can also be realized at this stage within the quantum processor.

Thanks to the use of the detuned third-order process, the error due to this scheme's absorption of the photon scales as $(C_0M)^{-1/3}$. While this is slightly worse than the basic transfer scaling of $(C_0N)^{-1/2}$, it is comparatively easy to have a very large processor-qubit atom ensemble since the processor requires no initial W state preparation. In principle, by making $M>C_0^{1/2}N^{3/2}$ it is always possible to be limited by the $N^{-1/2}$ scaling that governs the efficiency of the release of a photon into the cavity by a memory qubit. The ensemble of M atoms could be distributed across multiple traps; with enough addressable internal states, it is possible to make all of the memory qubit ensembles collectively function as the processor ensemble to meet the $M>C_0^{1/2}N^{3/2}$ criteria.

FIG. 4B shows a variant of a two-qubit gate with fewer internal levels. In this gate, excitations from the control and target memory qubits (not shown) are absorbed by and processed within the set of remaining (spectator) processor qubits, where the quantum information in the mth processor qubit, shown in FIG. 4B, is shelved in states $|0\rangle_m$ and $|1\rangle_m$. This means that the number of atoms coupling to the cavity to absorb the photon is the sum of the atom numbers in all of the spectator qubits across the quantum computer.

The scheme detailed in FIG. 4B works as follows. The processor-qubit atom ensemble begins in state $|g\rangle$, then transfers the amplitude from one of the control memory qubit logical states into the state $|0\rangle_p$. Pulsing the target memory qubit puts a photon into the cavity (through either a π-pulse or vacuum STIRAP) if it is in the $|0\rangle$ state. Subsequently, turning on the microwave drive ω and classical optical drive Ω causes the processor-qubit atom ensemble to absorb this photon, moving the excitation from state $|0\rangle_p$ to state $|1\rangle_p$ within the processor-qubit atom ensemble, otherwise reabsorbing the photon into the target memory qubit. At this point, there is now only an excitation in state $|1\rangle_p$ if the control qubit was in state $|0\rangle$ (so an excitation was transferred to state $|0\rangle_p$) and if the target qubit was in state $|0\rangle$ (so that the excitation in state $|0\rangle_p$ was moved to state $|1\rangle_p$ by photon absorption). A single qubit phase rotation of (−1) on the state $|1\rangle_p$ and subsequent reversal of the previous steps then accomplishes an overall C-phase gate between the control and target qubits.

Transfer Error Estimates

The expected errors due to losses during the transfers follow an $N^{-1/2}$ scaling for basic transfers and an $M^{-1/3}$ scaling for third-order entangling transfers.

During a basic transfer there are two primary sources of decoherence: photon cavity losses and atomic excited state decays from the residual excited state population. Considering a direct transfer of an excitation from an ensemble into the cavity mode using a detuned two-photon drive (one leg driven by the cavity mode with coupling $g_0$ and the other leg driven with a classical laser beam $\Omega$) with detuning $\Delta$ from the excited state, we can estimate the losses analytically. Assuming the losses are small enough to treat differentially, the cavity photon and the excited state losses are approximately $\kappa T$ and $(\Omega^2/\Delta^2)\Gamma T$ respectively, where $1/T \approx \Omega_R = \Omega(\sqrt{N_{g0}})/\Delta$ is the two-photon Rabi frequency and T is the transfer duration. Thus, with the other parameters fixed, increasing the detuning $\Delta$ decreases the losses from the excited state by reducing the excited state population, but increases the losses from the cavity because it decreases $\Omega_R$, causing the photon to spend more time in the cavity mode. The minimum total loss occurs when these two terms are equal, which gives the condition that $\Omega/\Delta = \sqrt{\kappa/\Gamma}$ and that the minimum loss is proportional to $1/(NC_0)^{1/2}$.

Similar considerations apply to the dynamics of the basic dark-state transfer given by Eq. (1). If the transfer were done infinitely slowly, there would be no population of the excited state and so no losses due to $\Gamma$, but because the dark state has an intermediate component with a photon occupying the cavity, a slower dark-state transfer can lead to greater photon losses. Thus, for the dark-state transfer, the characteristic transfer time parameter $\tau$ over which $\Omega_m(t)$ and $\Omega_p(t)$ are ramped is analogous to the detuning $\Delta$ for the direct two-photon pulse, in the sense that the value of the characteristic transfer time parameter $\tau$ sets whether the cavity decay or excited-state decay dominates the transfer loss. This suggests similar scaling for both cases.

FIG. 5 shows results of a simulation of the dark-state transfer from Eq. (1) with non-Hermitian terms added to reflect losses $\kappa$ and $\Gamma$ and Gaussian pulses for $\Omega_m(t)$ and $\Omega_p(t)$. It is a plot of the loss fraction versus ensemble size N for different single-atom cooperatives. In FIG. 5, the asymptotic behavior where the loss is differential fits to a power law $P_{error} = 1.4/(NC_0)^{1/2}$. The duration of the adiabatic transfer is about 10 µs, and parameters of $\Gamma = 38$ µs$^{-1}$ and $\kappa = 12$ µs$^{-1}$ were used in the simulation.

Next, consider the errors involved during the third-order absorption up of the photon. Suppose the processor ensemble has M atoms. There are three fundamental sources of error that depend on the parameters of the system: (1) there could be a cavity decay of the photon, (2) a decay through the atomic excited state, or (3) one of the atoms in the state $|g\rangle$ could be off resonantly driven into one of the logical states, giving a total error which scales as:

$$P_{error} \approx \kappa T + \frac{\Omega^2}{\Delta^2}\Gamma T + M\frac{\omega^2}{\delta^2} + M\frac{(g_0\Omega/\Delta)^2}{\delta^2}$$

where $1/T = (\sqrt{M}\omega)(\sqrt{M}g_0)\Omega/\Delta\delta$ gives the approximate duration T of the $\pi$-pulse absorption of the photon. The minimum of $P_{error}$ occurs where the detunings and Rabi drives are chosen to make each of the contributions to the error equal. Setting the first two terms (cavity and excited state decays) equal gives the condition $\Omega/\Delta = \sqrt{\kappa/\Gamma}$, and setting the last two terms (off-resonant populations of each of the logical states) equal gives $\omega = g\Omega/\Delta$. Applying these constraints and setting the second and third terms equal yields $\Omega/\delta = (\sqrt{\Gamma\kappa}/M^2 g_0)^{1/3}$, so that with this final constraint all the terms are equal and scale as $(MC_0)^{-1/3}$.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of quantum information processing, the method comprising:
   trapping an array of atom ensembles within a cavity;
   coupling the array of atom ensembles to a resonant optical mode of the cavity; and
   transferring, via the resonant optical mode of the cavity, quantum information between at least two atom ensembles in the array of atom ensembles without accessing Rydberg states of the at least two atom ensembles.

2. The method of claim 1, further comprising:
   performing a Rydberg gate between excitations within the at least two atom ensembles.

3. The method of claim 1, further comprising, before coupling the array of atom ensembles to the resonant optical mode of the cavity:
   initializing an atom ensemble in the array of atom ensembles in a Dicke state such that a matrix element representing a photon emission by the atom ensemble into the resonant optical mode is collectively enhanced.

4. The method of claim 3, wherein initializing the atom ensemble in the Dicke state comprises using a Rydberg blockade.

5. The method of claim 1, wherein transferring the quantum information is from two atom ensembles in the array of atom ensembles to a third atom ensemble in the array of atom ensembles.

6. The method of claim 5, further comprising:
   performing a local Rydberg gate on the quantum information transferred to the third atom ensemble.

7. The method of claim 1, wherein transferring the quantum information is from a first pair of atom ensembles in the array of atom ensembles to a second pair of atom ensembles in the array of atom ensembles, and further comprising:
   performing a local Rydberg gate on the quantum information transferred to the second pair of atom ensembles.

8. The method of claim 1, wherein transferring the quantum information comprises performing a dark-state transfer of the quantum information from a first atom ensemble in the array of atom ensembles to a second atom ensemble in the array of atom ensembles via the resonant optical mode of the cavity.

9. The method of claim 8, wherein performing the dark-state transfer comprises:
   causing the first atom ensemble to emit a photon into the resonant optical mode of the cavity; and
   causing the second atom ensemble to absorb the photon.

10. The method of claim 9, wherein the photon encodes a quantum state of the first atom ensemble.

11. The method of claim 8, wherein the dark-state transfer is a first dark-state transfer, the second atom ensemble has at least two internal energy states, and further comprising:
    performing a second dark-state transfer of quantum information from a third atom ensemble in the array of atom ensembles to the second atom ensemble via the resonant optical mode of the cavity.

12. The method of claim 11, wherein the first dark-state transfer and the second dark-state transfer occur simultaneously.

13. The method of claim 1, wherein the at least two atom ensembles in the array of atom ensembles comprise a first atom ensemble and a second atom ensemble separated in the array of atom ensembles by at least one other atom ensemble.

14. The method of claim 1, further comprising:
    encoding quantum information, by the array of atom ensembles, using a W state.

15. The method of claim 14, further comprising:
    creating the W state using a Rydberg blockade.

16. A system comprising:
    a cavity;
    a first laser, optically coupled to the cavity, to trap an array of atom ensembles within the cavity; and
    a second laser, in optical communication with the array of atom ensembles, to illuminate a first atom ensemble in the array of atom ensembles with a laser pulse, the laser pulse causing the first atom ensemble to transfer quantum information to a second atom ensemble in the array of atom ensembles via a photon coupled into a resonant optical mode of the cavity without accessing Ryberg states of the first atom ensemble or the second atom ensemble.

17. The system of claim 16, wherein the first laser is configured to generate a standing-wave optical lattice in the cavity with different atom ensembles in the array of atom ensembles trapped in respective lattice sites of the standing-wave optical lattice.

18. The system of claim 16, further comprising:
a beam-scanning element, in optical communication with the array of atom ensembles and the second laser, to direct the laser pulse emitted by the second laser to the first atom ensemble.

* * * * *